Feb. 17, 1970 G. E. SWICK, JR., ET AL 3,495,450
BRAKE TEST ACCEPT-REJECT INDICATOR FOR MINIMUM
EFFORT AND MAXIMUM DIFFERENTIAL
Filed Jan. 12, 1968 8 Sheets-Sheet 1
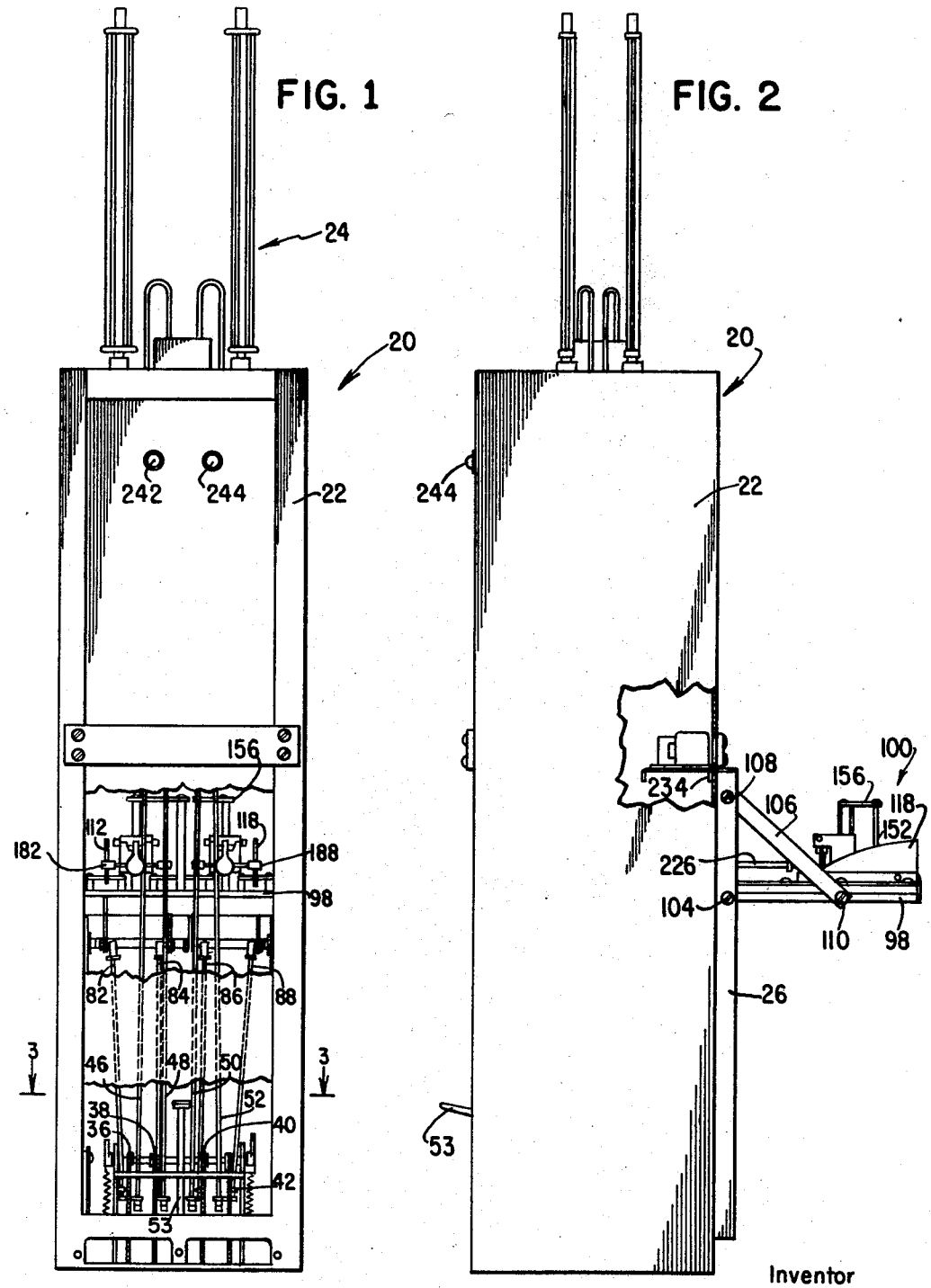
Inventor
GEORGE E. SWICK JR.
LAWRENCE C. MATHIES JR.
BY
Prangley, Baird, Clayton, Miller & Vogel
ATTYS.

Feb. 17, 1970   G. E. SWICK, JR., ET AL   3,495,450
BRAKE TEST ACCEPT-REJECT INDICATOR FOR MINIMUM
EFFORT AND MAXIMUM DIFFERENTIAL
Filed Jan. 12, 1968   8 Sheets-Sheet 2

Inventor
GEORGE E. SWICK JR.
LAWRENCE C. MATHIES JR.
BY
Prangly, Baird, Clayton, Miller & Vogel. ATTYS.

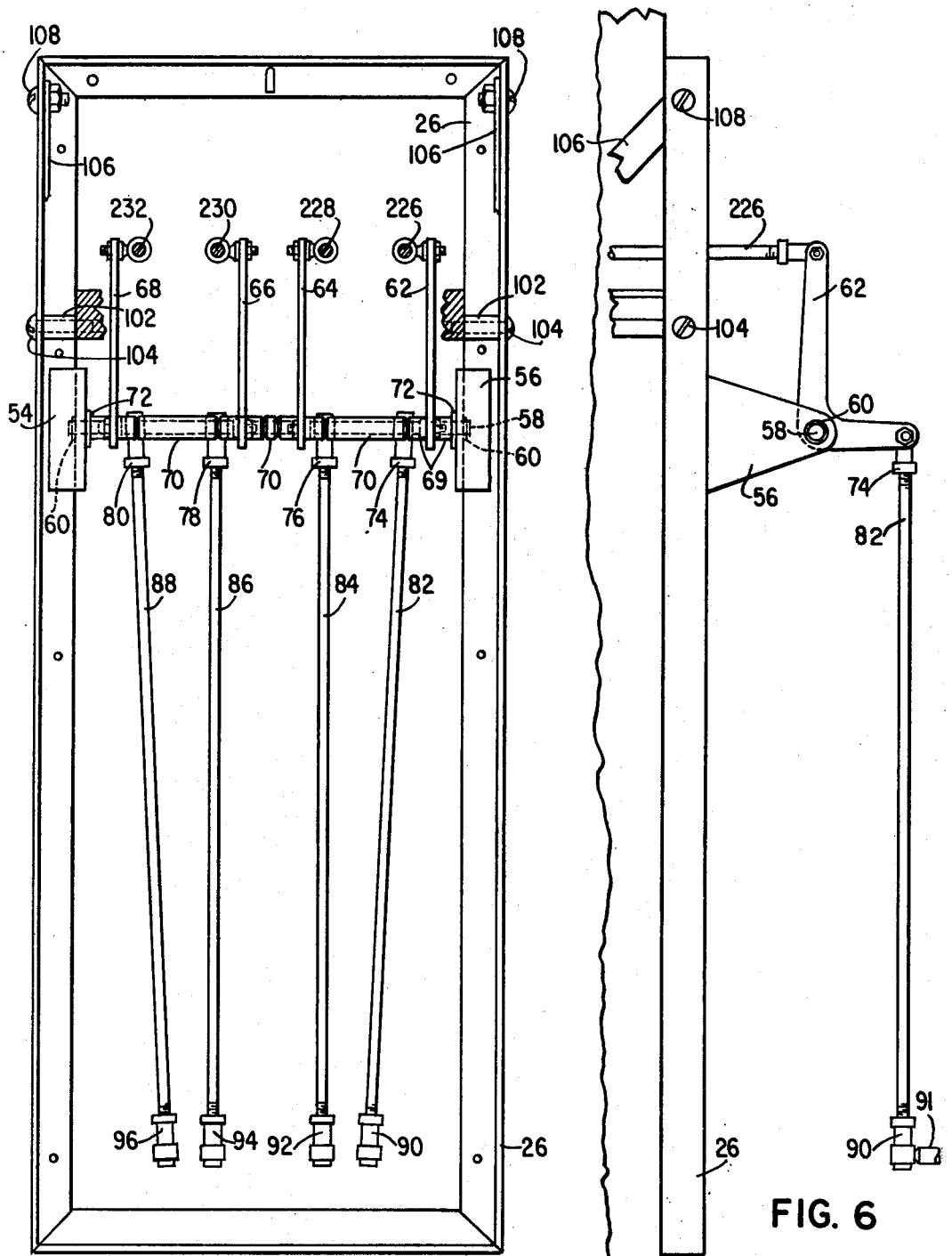
FIG. 5
FIG. 6
Inventors
GEORGE E. SWICK JR.
LAWRENCE C. MATHIES JR.
BY
 ATTYS Inventors
GEORGE E. SWICK JR.
LAWRENCE C. MATHIES JR.
BY
*Prangley, Baird, Clayton, Miller & Vogel.*
ATTYS

FIG. 11
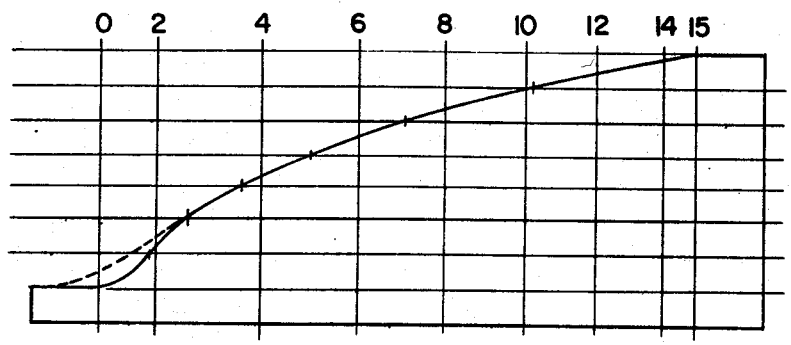
FIG. 12
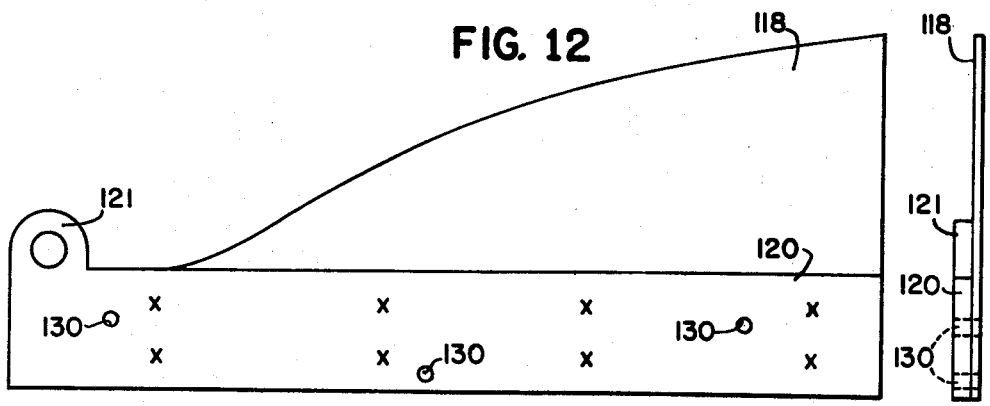
FIG. 13
Inventors
GEORGE E. SWICK JR.
LAWRENCE C. MATHIES JR.
BY
*Prangly, Baird, Clayton, Miller & Vogel.*
ATTYS.

Feb. 17, 1970 G. E. SWICK, JR., ET AL 3,495,450
BRAKE TEST ACCEPT-REJECT INDICATOR FOR MINIMUM
EFFORT AND MAXIMUM DIFFERENTIAL
Filed Jan. 12, 1968 8 Sheets-Sheet 8

Inventors
GEORGE E. SWICK JR.
LAWRENCE C. MATHIES JR.
BY
Prangly, Baird, Clayton, Miller & Vogel.
ATTYS.

United States Patent Office 3,495,450
Patented Feb. 17, 1970

3,495,450
BRAKE TEST ACCEPT-REJECT INDICATOR
FOR MINIMUM EFFORT AND MAXIMUM
DIFFERENTIAL
George E. Swick, Jr., and Lawrence C. Mathies, Jr.,
Springfield, Ill., assignors to Dura Corporation, Oak
Park, Mich., a corporation of New York
Filed Jan. 12, 1968, Ser. No. 697,516
Int. Cl. G01l 5/28; B60q 1/26
U.S. Cl. 73—122                    49 Claims

ABSTRACT OF THE DISCLOSURE

This invention relates to brake testers. More particularly, it relates to brake testers which provide automatically an indication as to whether the brakes of the vehicle are acceptable in that the brake on each wheel produces more than a predetermined minimum braking effect, and in that as compared with each other, neither of the brakes on the front wheels and neither of the brakes on the rear wheels produces a braking effect which is less than a predetermined minimum percentage of the braking effect produced by the other wheel on the same axle. The brake tester disclosed has a structure which is basically the same as that of the brake testers disclosed in U.S. Patents Nos. 1,892,919 and 2,940,307. Along with this basic structure, the tester is provided with a switch and pilot light assembly, an electric panel, a sensing switch assembly and a mounting frame and covers. The sensing switch assembly is actuated through two to one levers by four rods, one for each wheel of the vehicle to be tested, which rods are secured, respectively, at one end to the quadrants or sectors which are parts of the brake testers disclosed in the above mentioned U.S. patents, and at the other end, to four slidably supported cam members so that the extent of the movement of the cam members, respectively, is determined by the respective braking effects exerted by the four wheels. Four normally closed switches are adjustably mounted, respectively, adjacent the four cams so that they are engaged by the cams and held open when the unit is ready to perform a test. These four switches are positioned so as to be released when the cam with which they are associated is moved a distance greater than the distance corresponding to the predetermined minimum braking effect. Another set of four normally closed switches is provided, these being mounted in pairs on two rocking arm assemblies which ride the cam surfaces, one pair being located between and responsive to the front wheel cams and the other pair being located between and responsive to the rear wheel cams. The form of the cam contours is directly related to the maximum acceptable differential. Juxtaposed to each rocker arm supported switch is an adjustable stop mounted on the support on which the associated rocking arm assembly pivots. The switches are so positioned on the rocking arm assemblies that when the stops are properly adjusted, a a differential in excess of the predetermined maximum will produce a tilt in the associated rocking arm assembly which is sufficient to bring the operator carried by one or the other of the two switches thereon (depending on which brake exerts the greater braking effect) into engagement with its stop thereby moving that switch to open position.

All eight switches are connected in series with each other, and also with the coil of a relay and with a source of power so that when all eight switches are in their normally closed position the relay coil is actuated. When actuated, the relay coil closes the circuit to a green indicator light. If any of the eight switches is open, however, the relay coil becomes de-energized, which in turn completes the circuit to a red indicator light. From the above description, it will be clear that if the brakes undergoing the test are acceptable, all of the eight switches will be closed at the end of the test, causing the green light to be lighted indicating acceptance. Otherwise, one or more of the switches will open, illuminating the red light and indicating rejection. Also since as noted above, the minimum effort switches are held in open position when the machine is ready for test, the red light is illuminated at this time, indicating such readiness.

---

This invention relates to brake testers for automobiles and the like. More particularly, it relates to devices for automatically indicating acceptance or rejection.

Vehicle wheel brake testers of the type disclosed in United States Patents Nos. 1,892,919 and 2,940,307 are and have been well known and widely used for many years. In the operation of such brake tester, the reaction of an automobile on the four wheel plates of the testers is transmitted through mechanical linkage to four ratchet quadrants in the base of a column, the retchets holding the resultant readings until manually released. Various types of indicators have been employed in such brake testers, perhaps the best known being tubes containing colored liquid, four such tubes being provided so that the height of the liquid in each tube provides an indication of the braking effort exerted on the wheel plate to which it is responsive.

It is an object of the present invention to provide a device which can be built into or provided as an attachment for brake testers of the foregoing type, and which automatically indicates acceptance or rejection of the brakes of the vehicle under test.

A further object of the invention is to provide such a device in which acceptance is indicated only when each of the brakes on the four wheels exerts a predetermined minimum effort and when the differential in the braking efforts exerted on the front wheels and the differential in the braking efforts exerted on the rear wheels are each less than a predetermined maximum.

Still another object of the invention is to provide such a device in which the desired indication is given by lights, one of which indicates acceptance and the other rejection.

Still another object is to provide a device in which novel means is employed to measure the differential.

Other objects will appear hereinafter.

In order that the invention may be better understood, reference is made to the accompanying drawings which form a part of this specification and in which:

FIG. 1 is a view in front elevation of a brake tester embodying the features of the present invention with a portion of the front wall of the housing removed;

FIG. 2 is an end elevation of the brake tester shown in FIG. 1;

FIG. 5 is an enlarged fragmentary rear elevational view of the structure shown in FIG. 1;

FIG. 6 is an end view of the structure shown in FIG. 5;

FIG. 11 is a view illustrating the laying out of the cams which are one of the features of the present invention;

FIG. 12 is an elevational view of a cam laid out as illustrated in FIG. 11;

FIG. 13 is an end elevation of the cam shown in FIG. 12;

Figure 4:
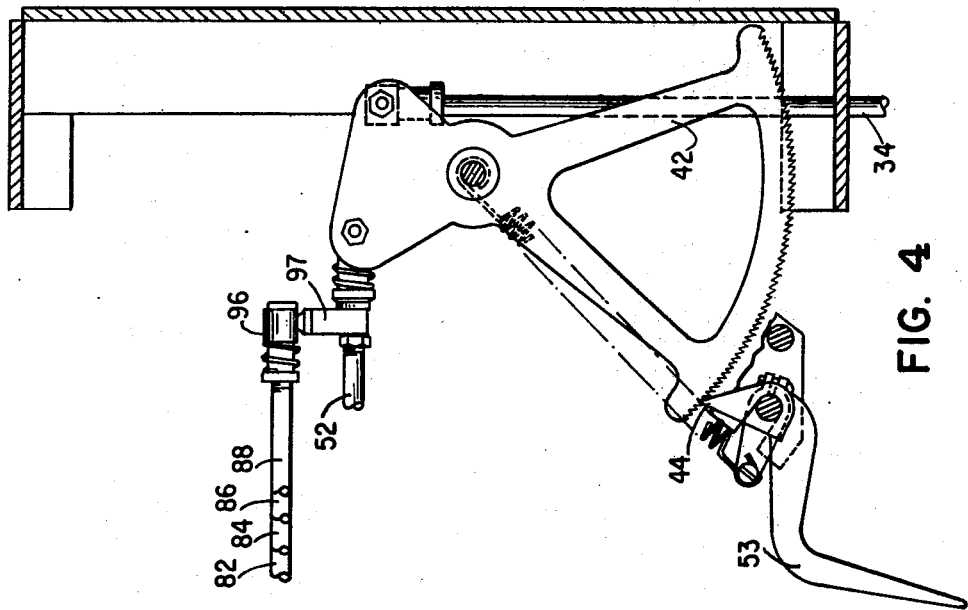
FIG. 4 is a view in cross section on the line 4—4 in FIG. 3.

Portions of the brake testers previously known, as disclosed in the above identified United States patents, are included in FIGS. 1, 2, 3 and 4 for the purpose of showing how the device forming the subject matter of the present invention is interconnected therewith. Thus, the previously known brake testers comprise a column designated generally 20 provided with a housing 22. Mounted above the housing 22 in a position to be readily visible are transparent tubes 24 which through mechanism, of which only part is shown, provide a visual indication of the results of a brake test, all as more fully shown and described in the above identified United States patents.

As is well known, brake testers such as are in part shown in FIGS. 1 and 2, are provided with four wheel plates, one for each wheel of a vehicle to be tested by means of which the braking effect of the brakes on each of the four wheels is measured. These measurements, through suitable mechanism, including rods such as the rods 28, 30, 32 and 34 (FIG. 3) are transmitted, respectively, to a series of four quadrants 36, 38, 40 and 42, pivotally supported at the bottom of the column 20 as may be seen in FIG. 1.

As is well known and more fully described in the above identified patents, the action of the wheel plates when a set of brakes is tested produces longitudinal movements of rods 28, 30, 32 and 34 in a direction outwardly of the column 20 which are proportional, respectively, to the numbers of pounds of braking effort exerted by the brakes on each of the four wheels of the vehicle tested. As best seen by reference to FIG. 4 in which the rod 34 and the quadrant 42 to which it is attached are shown, such outward movement of those rods produces pivotal movements of the quadrants 36, 38, 40 and 42 in a clockwise direction as viewed in FIG. 4. As may be also seen in FIG. 4, the quadrants, such as the quadrant 42, are each provided with teeth engaged by a spring loaded pawl, such as pawl 44, so that the quadrants are retained in the positions to which they are so pivoted while the wheel plates, through lost motion connections, not shown, are returned to their neutral or pre-test positions.

Figure 3:
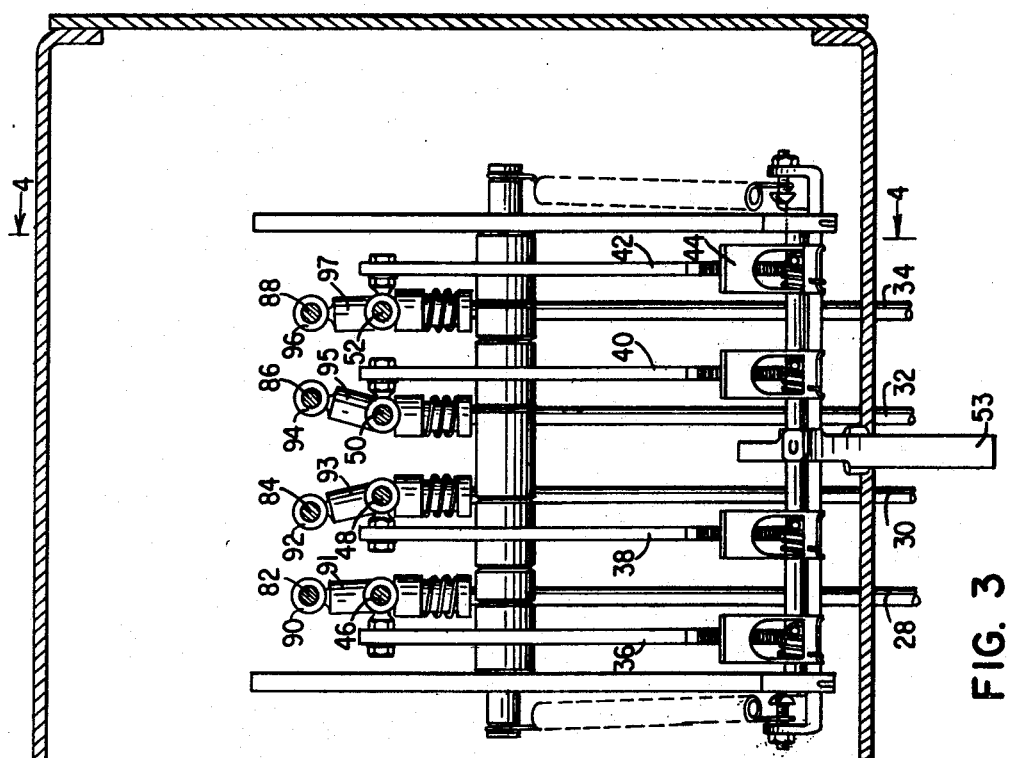
FIG. 3 is an enlarged view partially in cross section on the line 3—3 in FIG. 1.
Figure 7:
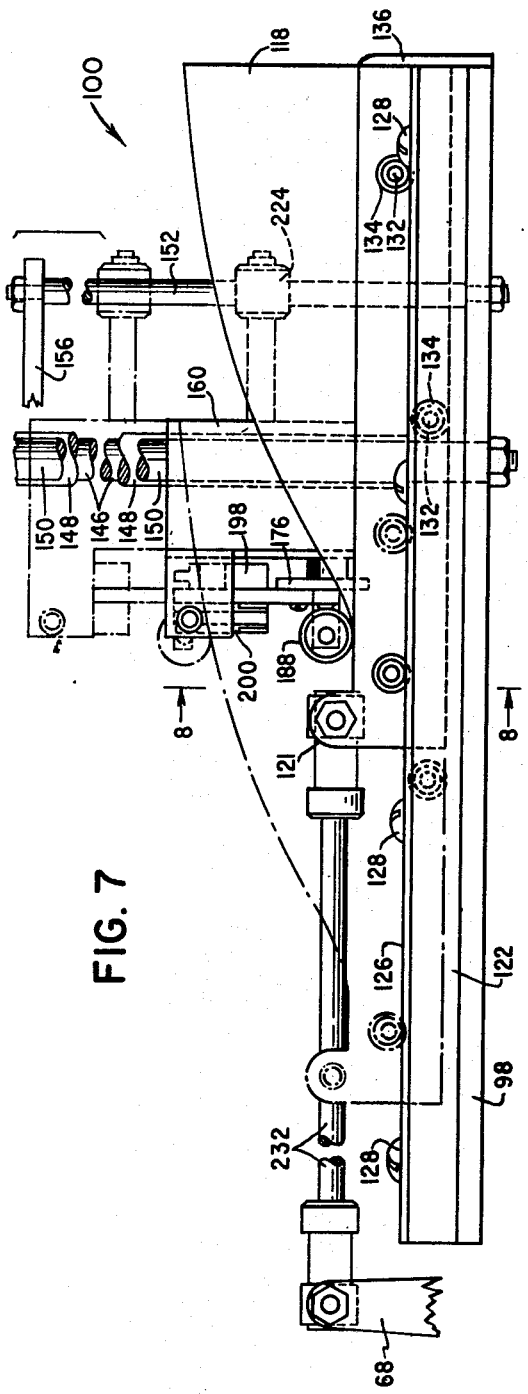
FIG. 7 is an enlarged fragmentary view of part of the structure shown in FIG. 2.

Referring back to the previously mentioned tubes 24, it is pointed out that portions of the mechanism by which the braking effort measurements are transmitted through the quadrants 28, 30, 32 and 34, to those tubes are shown in FIGS. 3 and 4. These portions are the lower ends of generally vertically extending rods designated respectively, 46, 48, 50 and 52, which by suitable ball joint connectors as shown, are secured respectively to the quadrants 36, 38, 40 and 42 so as to be moved downwardly as the quadrants are pivoted, as previously described, in a clockwise direction. To complete the description of the pertinent portions of the brake testers as previously known, it is pointed out that the handle 53 serves as means for disengaging the pawls such as pawl 44, thereby permitting the quadrants 36, 38, 40 and 42 to return to their pre-test positions.

In accordance with the present invention, a portion of the rear wall of the housing 22 is eliminated, and a rectangular frame 26 (FIGS. 2, 5 and 6) is suitably secured on the lower part of the back portion of the column 22 as shown in FIG. 2. This frame 26 carries a pair of brackets 54 and 56 which extend into the column 20 and are apertured adjacent their inner ends to receive a shaft 58 which is secured in position on the brackets by retaining rings 60. Pivotally supported on the shaft 58 between the brackets 54 and 56 is a series of 2:1 levers, 62, 64, 66 and 68, each of which is provided with hubs, such as the hubs 69 on lever 62. The levers are maintained in their desired spaced relation on the shaft 68 by suitable spacing collars 70 of the appropriate length. As may be seen, the outer hubs on levers 62 and 68 engage, respectively, larger collars 72 located alongside the brackets 54 and 56.

Each of the levers 62, 64, 66 and 68 is provided with an aperture adjacent the inner end of its shorter arm, which apertures serve to provide means by which the ball joint connectors 74, 76, 78 and 80 serve to connect those levers, respectively, to generally vertically extending rods 82, 84, 86 and 88. As best seen in FIGS. 3 and 5, the generally vertically extending rods 82, 84, 86 and 88 are in turn secured at their lower ends by ball joint connectors 90, 92, 94 and 96, respectively, and transmission blocks 91, 93, 95 and 97, respectively, thereby providing a mechanical connection between the above described wheel plates not shown, and the 2:1 levers 62, 64, 66 and 68.

Figure 9:
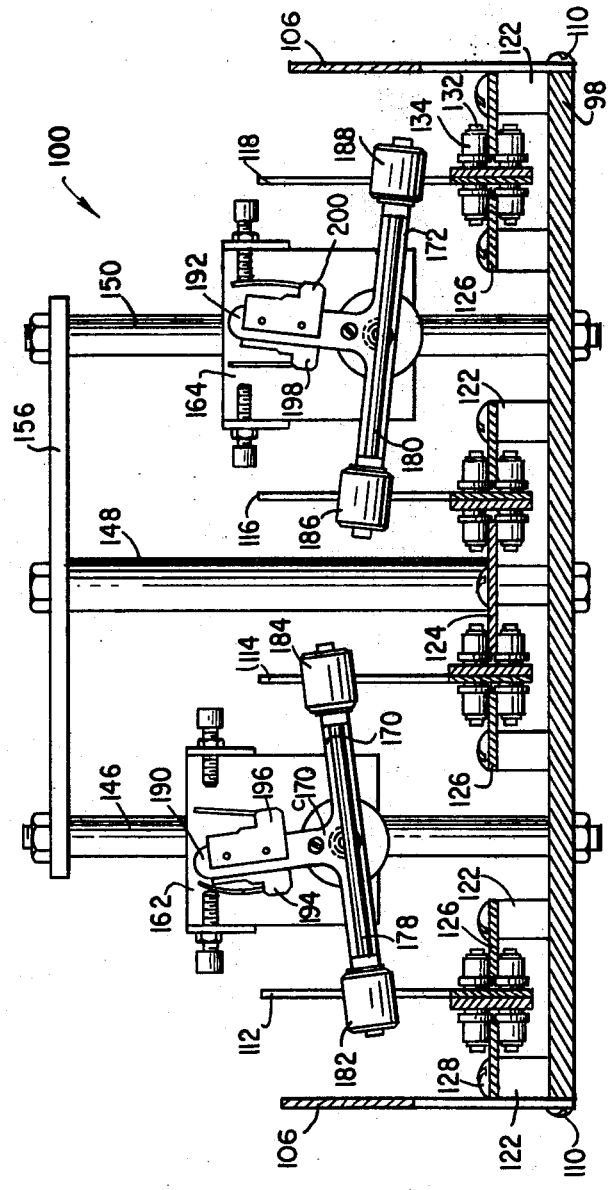
FIG. 9 is a view similar to FIG. 8 showing the parts of the structure in different positions.

As best seen in FIG. 2, the frame 26 also supports a base plate 98 on which is mounted a sensing switch assembly designated generally 100, located to the rear of the column 20. To this end, as shown in FIG. 5, sleeve members 102 are suitably secured to the frame 26 in alignment with openings through the rearwardly extending upright portions of the frame. Suitable threaded fasteners 104 are inserted through those openings and the aligned sleeves 102 and threaded into the sides of the base plate 98 to secure it to the frame 26. Also, as shown in FIGS. 2 and 9, braces 106 secured adjacent their upper ends at 108 to the frame 26, and at their lower ends to the base plate 98 at 110, on each side thereof, support the plate 98 in the desired horizontal position to the rear of the column 20.

Referring next to FIGS. 7, 8, 9 and 10, it will be seen that the base plate 98 has slidably supported thereon a series of four cam members 112, 114, 116 and 118. These cams which are identical in structure, are relatively thin metal plates, having a configuration which is best shown in FIG. 12. For bracing purposes, a somewhat thicker metal strip 120 is secured to one side of each cam along its lower edge, as for example, by spot welding. As may be seen, these bracing strips, such as the strip 120, are somewhat longer than the cams, and the protruding portion is provided with an upstanding apertured ear 121 for a purpose to be described.

The base 98 carries thereon a series of tracks for guiding and supporting cams 112, 114, 116 and 118 in their sliding movements which comprise seven spacer members 122 extending in parallel relation longitudinally of the base. Supported on these spacer members are a relatively wide sheet metal strip 124 and somewhat narrower sheet metal strips 126, all of which also extend longitudinally of the base 98. These strips and spacers are secured to the base 98 by a plurality of bolts 128 extending through the strips and spacers and threaded into suitable openings in the base.

Figure 8:
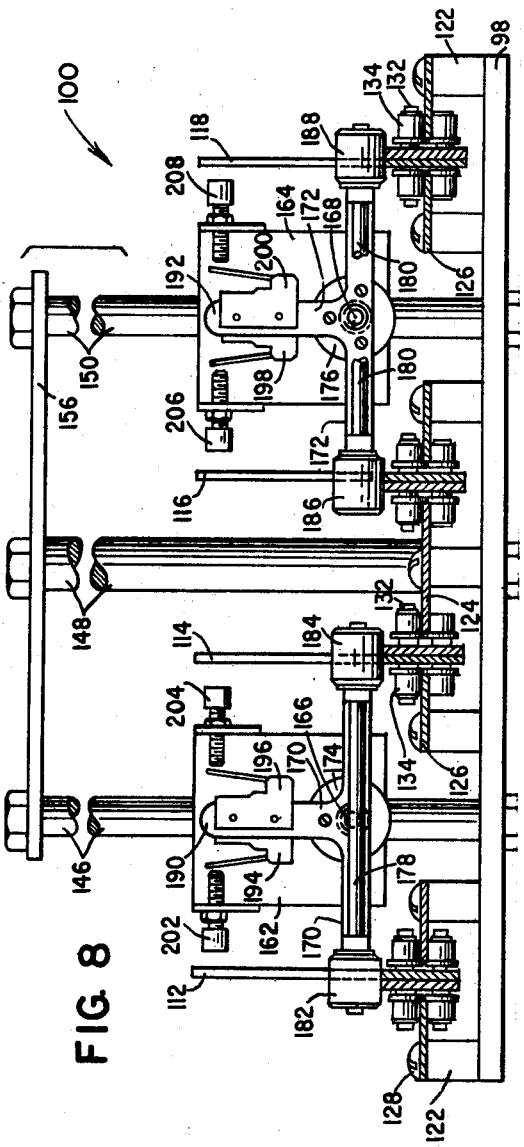
FIG. 8 is a view partly in cross section on the line 8—8 in FIG. 7.
Figure 10:
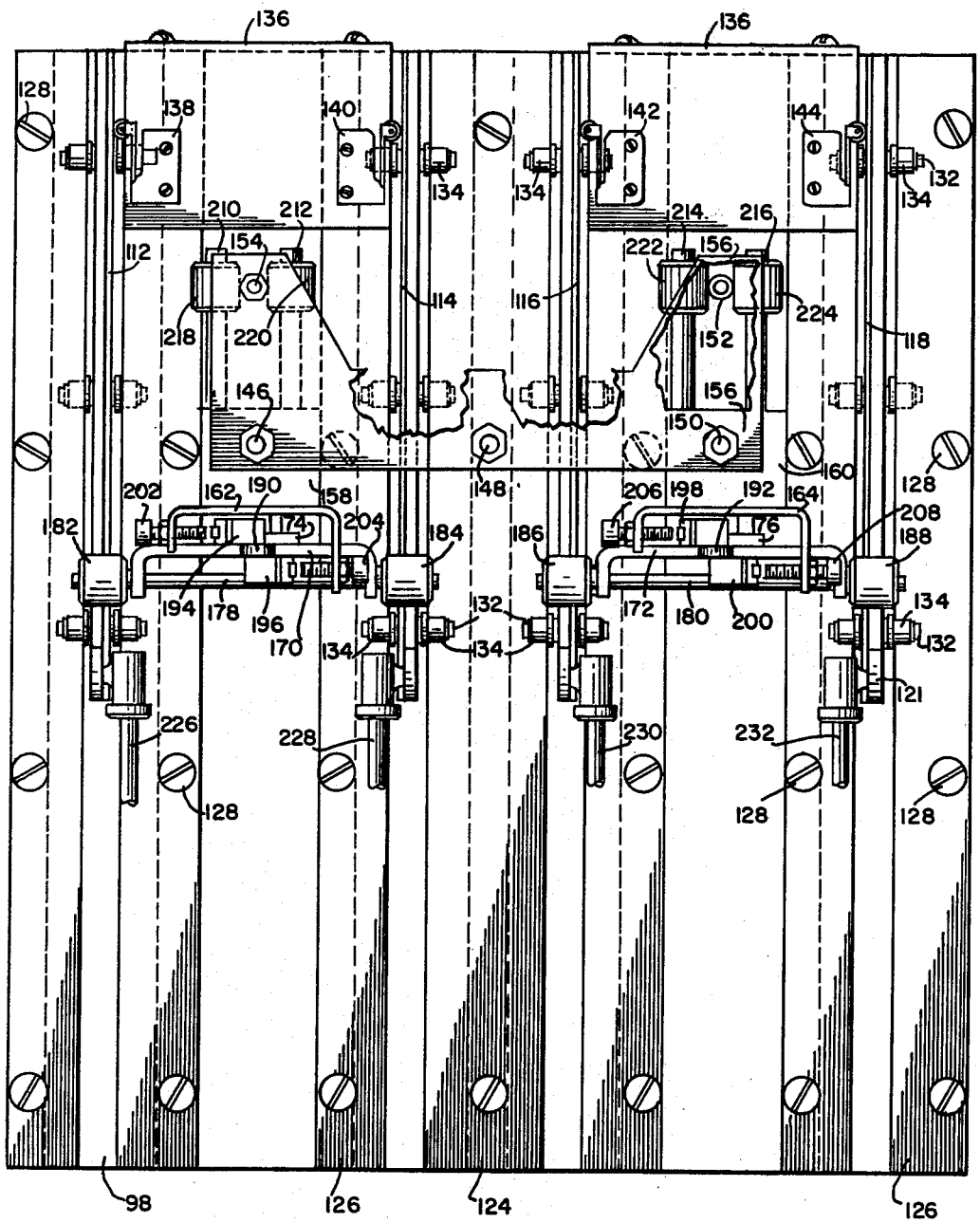
FIG. 10 is a plan view of the structure shown in FIG. 8.

For cooperation with the strips 124 and 126 in supporting the cams 112, 114, 116 and 118 in their sliding movements, each cam is provided with a set of rollers. To this end, each cam and its associated bracing strip 122 has a series of three openings 130 formed therein at the locations indicated in FIG. 12. Shafts 132 extending in these openings rotatably support on each end thereof a flanged roller 134, as best seen in FIGS. 8, 9 and 10. As appears from FIG. 7, the sets of rollers adjacent the ends of the cams are thus located above the strips 124 or 126, as the case may be, whereas the rollers which are centrally located on the cams are positioned below those strips. From the foregoing description, it will be apparent that the cams 112, 114, 116 and 118 are consequently supported on the base 98 for substantially frictionless sliding movement thereon along predetermined paths extending lengthwise of the base.

Also secured on the base 98 at the rear or right hand end thereof, as viewed in FIG. 10, are a pair of brackets 136. It will be noted that one of these brackets extends forwardly between the tracks in which the cams 112 and 114 slide, and that the other extends forwardly between the tracks in which the cams 116 and 118 slide. Mounted on the first mentioned bracket are a pair of switches 138 and 140, and mounted on the second mentioned bracket are another pair of switches 142 and 144. For reasons which will appear later, each of these switches is a normally closed switch, and it is important to note that the switches are positioned respectively adjacent the four cams 112, 114, 116 and 118, so that when those cams are in their rearmost position on the base 98, the operating arms of the respective switches are engaged by the cams, thereby holding the switches in open position.

Lastly, the base 98 also carries a rocking arm assembly which is mounted on five columns or posts 146, 148, 150, 152 and 154, each of which is secured on its lower end to the base 98, and each of which on its upper end extends through a plate 156, and is secured thereto by suitable means such as the nuts shown. Slidably mounted on the posts 146 and 150, respectively, are blocks 158 and 160. Suitably supported on the front faces of the blocks 158 and 160, respectively, are plates 162 and 164. The blocks 158 and 160 also carry, respectively stub shafts or pivots 166 and 168. At their forward ends, the shafts 166 and 168 pivotaly support, respectively, rockers 170 and 172, which are maintained in place thereon by retaining rings as shown in FIG. 8. To aid in stabilizing the pivotal movements of the rockers 170 and 172, the shafts 166 and 168, respectively have hubs 174 and 176 mounted thereon to which the adjacent rockers are secured by threaded fasteners as shown. The hubs 174 and 176 also serve to provide the proper spacing between rockers 170 and 172 and plates 162 and 164, respectively.

The rockers 170 and 172 are identical in structure, each having two laterally extending arms terminating in forwardly bent portions which are apertured, and each also having an arm extending upwardly from the shaft on which the rockers pivot. Supported, respectively, in the apertures provided in the laterally extending arms on the rockers 170 and 172 are shafts 178 and 180, the projecting ends of which carry rollers 182, 184, 186 and 188 which are secured, respectively, between the ends of the arms of the rockers and retaining rings provided on the ends of the shafts 178 and 180 which rollers are thereby so positioned as to ride respectively on the upwardly facing surfaces of the cams 112, 114, 116 and 118.

Referring back now to the upwardly extending arms of the rockers 170 and 172 which are designated, respectively, 190 and 192, it is pointed out that these each serve as supports for a pair of switches designated, respectively, 194, 196, 198 and 200, it being noted that the switches 194 and 198 are mounted on the rear surfaces of the arms, and the switches 196 and 200 on the front surfaces. As best seen in FIGS. 8 and 10, the plates 162 and 164, previously mentioned, are provided adjacent their upper edges with forwardly bent portions having threaded apertures which receive, respectively, four small bolts, 202, 204, 206 and 208, each of which is provided with a locknut. As appears from FIG. 10, these bolts 202, 204, 206 and 208 are, respectively, so positioned as to extend into the paths in which the operating arms of the switches 194, 196, 198 and 200 move when the rockers 170 and 172 pivot so that these four bolts thus serve, respectively, as adjustable stops for those operating arms.

As a further means for minimizing any wobbling of the rockers 170 and 172 during their pivotal movements the blocks 158 and 160 are provided, respectively, with rearwardly extending rods or arms 210, 212, 214 and 216. As best seen in FIG. 10, the rods 210 and 212 extend rearwardly beyond post 154 and on opposite sides thereof, and in like manner, the rods 214 and 216 extend rearwardly beyond the post 152, and likewise on opposite sides thereof. These arms 210, 212, 214 and 216 carry, respectively, rollers 218, 220, 222 and 224 which by riding on the posts 152 and 154 during vertical reciprocation of the blocks 158 and 160 on the posts 146 and 150, serve to provide the desired stabilization of the pivotal movements of the rockers.

By referring to FIGS. 5, 6, 7 and 10, it will be seen that the connection of the cams to the wheel plates is completed by a series of four rods 226, 228, 230 and 232, provided on each end with ball joint connectors. Referring to FIG. 12, it will be recalled each cam is provided with an apertured ear exemplified by the ear 121 on cam 118, the purpose of which is to permit ball joint connectors to be attached to each cam. Also as appears from FIGS. 5 and 6, the long arms of each of the levers 62, 64, 66 and 68 are likewise provided with openings adjacent their outer ends for the same purpose. Thus, through the ball joint connectors on each end thereof, the rods 226, 228, 230 and 232 connect, respectively, cam 112 and lever 62, cam 114 and lever 64, cam 116 and lever 66, and cam 118 and lever 68.

The configuration of the four cams which as noted above are identical, is illustrated in detail in FIGS. 11, 12 and 13. As previously explained, the criteria used in determining whether the brakes of the vehicle should be rejected include the differentials between each of the pairs of wheels on the same axle, i.e., the differential between the braking efforts on the front wheels and the differential between the braking efforts on the rear wheels. More specifically, a vehicle is to be rejected if either of these differentials exceeds a predetermined maximum which for purposes of illustration will be taken to be 30% based on the higher of the two braking efforts of the wheels on the same axle. Or to state it in another way, if the braking effort on one of the front wheels is less than 70% of the braking effort on the other, the vehicle is to be rejected, and the same is true with respect to the rear wheels. Thus, this is one factor which enters into the structure of the cams, since they aid in applying these criteria to the test results.

It has been noted above that in the basic brake tester on and in connection with which the present invention is employed, the movements of the wheel plates are each directly proportional to the braking efforts exerted on the wheels in engagement therewith. However, in the transmission of these movements from the wheel plates to the cams, because of the rotary movement involved, this direct proportion is lost. Compensation for this is provided in the structure of the cams, and is the second factor entering into their configuration.

With this in mind, attention is first directed to FIG. 11, which shows how the cam is laid out for a maximum differential of 30%. In this figure, the series of vertical lines represents braking effort in hundreds of pounds from 0 to 1,500. The spacing between the lines is determined by the actual distance the cam is moved as a result of the exertion of the various amounts of braking effort on the wheel plates, so that, for example, the distance between the line marked 0 and the line marked 15 is the actual distance the cam is moved by 1,500 pounds of braking effort, and similarly, the distance between the line marked 0 and the line marked 6 is the actual distance the cam is moved by 600 pounds of braking effort.

The distances between the horizontal lines on the other hand, are uniform and correspond to the distance between horizontal planes passing respectively through the spots, where for example, rollers 182 and 184 engage the cams 112 and 114 with which they cooperate when the rocking arm 170 has been tilted just sufficiently to open one of the switches 194 or 196.

Using the above described vertical and horizontal lines as coordinates, a series of points are plotted, the first being plotted on the second line from the top at the point where it intersects the imaginary vertical line corresponding to a braking effort of 1,050 pounds, which is 70% of 1,500 pounds. On the next lower horizontal line, the point is placed approximately at the intersection of that line with the imaginary line corresponding to a braking effort equal to 70% of 1,050 pounds, which is approximately 735 pounds. The points on the successively lower lines are then similarly plotted so that each represents a braking effort which is approximately 70% of the braking effort marked on the line above it. Using these points and the intersections of the top line with the 1,500 pounds line, and the next to the bottom line with the 0 line, a curve is drawn as shown in FIG. 11 which represents substantially the proper configuration of the upper surfaces of the cams to achieve the desired results.

It has been found in practice, however, that a cam configuration following strictly the above described plot has the disadvantage that difficulties are encountered in the rolling of the rollers such as 182 over that part of the cam surface lying between approximately the 0 mark and the 200 pound mark as shown in FIG. 11. For this reason, it has been found to be preferable to have the cam configuration follow the dotted line adjacent the left hand end instead of the solid line beneath it. This creates no problem for the reason that if the brakes on any wheel exert less than a predetermined minimum braking effort, usually 250 pounds, the vehicle is to be rejected regardless of the differentials in braking efforts between the wheels on the same axle. The cams 112, 114, 116 and 118 are then fabricated using the plot shown in FIG. 11 as modified by the dotted line as a template.

Figure 14:
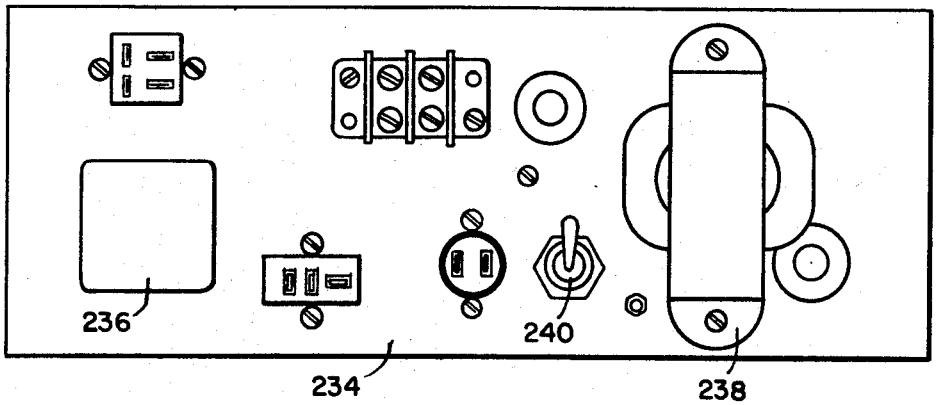
FIG. 14 is a plan view of the electrical panel forming a part of the present invention.

As best seen in FIGS. 2 and 14, a panel 234 secured to the frame 26 is preferably provided to support the electrical components which form a part of the "Accept-Reject" device illustrated in the drawings. Thus, relay 236, a transformer 238, a master switch 240 and various plugs and connector blocks provided for convenience in assembly are mounted on panel 234. It has been found preferable to provide a transformer such as the transformer 238 to reduce the voltage supplied by the usual 115 volt A.C. source to approximately 6 volts. This is desirable because of the necessity for flexibility in the wiring to the switches 194, 196, 198 and 200, the smaller wire which can be employed with 6 volts being inherently more flexible.

Figure 15:
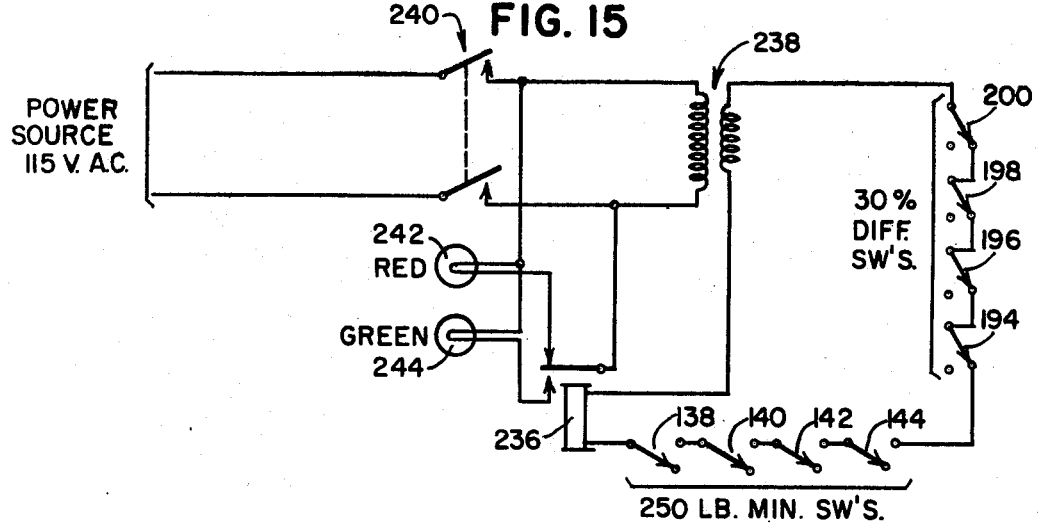
FIG. 15 is a circuit diagram of a device embodying the features of this invention.

FIG. 15 shows the circuit diagram for the device illustrated in the other figures. The main switch 240, which is a double pole-single throw switch controls the power supply. As may be seen and as indicated above, all of the switches 138, 140, 142, 144, 194, 196, 198 and 200 are connected in series with each other, and with the output of the transformer 238, and also with the coil of the relay 236. As a result, when any of the eight normally closed switches are open, the relay 236 is de-energized as shown in FIG. 15. Under these circumstances, a circuit is completed through the relay 236 from the power source to the red light 242. On the other hand, when all eight switches are closed, the relay 236 is energized to complete a circuit from the power source to the green light 244. These lights 242 and 244 as shown in FIG. 1 are, preferably, mounted on the front wall of the housing 22 of the column 20.

FIG. 15 shows the circuit as it exists when the device illustrated in the drawings is in the "Ready for Test" condition. At this time, the cams 112, 114, 116 and 118 are in the position shown in FIGS. 8 and 10, and in full in FIG. 7. As may be seen in FIG. 10, the cams are thus in engagement with the operating arms of the switches 138, 140, 142 and 144 holding them in open position as shown in FIG. 15 These switches are so positioned that they are held in open position unless and until the associated cam has been moved a distance corresponding to a braking effort of the predetermined minimum amount, for example, 250 pounds, on the wheel to which they are connected. Any greater movement than this moves the cam out of engagement with the operator of the associated switch, thereby permitting that switch to close. Thus, it will be apparent that if the desired minimum braking effort of 250 pounds is exerted on each wheel plate, all four of the switches 138, 140, 142 and 144 will thereby be permitted to close.

Turning now to the maximum differential criterion, it is important to bear in mind that since this criterion is applied only to wheels on the same axle, it is necessary that the cams 112 and 114 both be connected to either the two front wheels or to the two back wheels, and not to one front wheel and one back wheel, and that the same applies to cams 116 and 118 which must also be connected to the same pair of wheels. With this in mind, it is pointed out that switches 194, 196, 198 and 200, as may readily be seen in FIG. 8, are in their normally closed positions when the device is in the "Ready for Test" condition, and as previously indicated, these switches are open only when the rocker arms 170 or 172 on which they are supported have been tilted sufficiently to bring the operator of the switch into engagement with its associated adjustable stop.

From this it will be readily apparent that the stops 202, 204, 206 and 208 need to be properly positioned or adjusted in order to provide the desired "Accept-Reject" indications. This can be readily accomplished by, for example, moving the cam 112 manually to the position corresponding to a braking effort on its associated wheel plate of say, 1,000 pounds, and by moving cam 114 to a position corresponding to 700 pounds, i.e., 70% of the 1,000 pounds for which the cam 112 is set. The stop 204 should then be set to a position such that switch 196 still remains in its closed position, but will be opened immediately if cam 114 is moved to any position corresponding to a braking effort on its associated wheel plate of less than 700 pounds. By reversing the positions of the cams 112 and 114 so that cam 114 is at 1,000 pounds, and cam 112 is at 700 pounds, the stop 202 can be in like manner and set to its desired position. It will be obvious that stops 206 and 208 can likewise be properly set by similar manipulation of cams 116 and 118.

Assuming now that the device illustrated is in the "Ready for Test" condition, which has been described above, if a vehicle to be tested is in the well known way moved onto the wheel plates of the tester and braked, movements of the wheel plates will thereby be produced which are proportional, respectively, to the braking efforts exerted by the brakes on the wheels in engagement therewith. This produces, in turn, corresponding movements of the cams 112, 114, 116 and 118 as described above. If the brakes on the four wheels have exerted more than the predetermined 250 pound minimum effort, all four of the cams will have been moved far enough to release the operators on switches 138, 140, 142 and 144, thereby permitting those switches to move to their normally closed positions.

Assuming also for illustrative purposes, that cams 112 and 114 are connected to the front wheels, and assuming that the brakes on both these wheels exert substantially the same braking effort, it will be apparent from the foregoing description that cams 112 and 114 will be moved substantially the same distances, and that the rocking arm 170 will remain in a substantially horizontal position, thereby leaving both of switches 194 and 196 in their normally closed positions. And again assuming that the brakes on the rear wheels likewise exert substantially the same braking efforts for like reasons switches 198 and 200 will remain closed.

Thus, on the basis of the foregoing assumptions, at the conclusion of the forgeoing test all eight switches will be closed, and as a consequence in the light of the above description of the circuit diagram shown in FIG. 15, the relay 236 will be energized, lighting the green light 244 and indicating "Accept" for the test as desired.

If on the other hand, the brakes on any of the four wheels had exerted less than 250 pounds of braking effort, and assuming that it is the wheel to which cam 114 responds, switch 140 will remain open because cam 114 will not have moved far enough to release it. As a consequence, the circuit will remain open so that relay 236 will remain de-energized, and as a further consequence, red light 242 will remain lighted as it was at the start of the start of the test, indicating "Reject" as desired.

Assuming next that the brakes on all four wheels do exert the required minimum braking effort, all four of the switches 138, 140, 142 and 144 will have been permitted to close in the manner described above. Maintaining, however, the assumption that the cams 112 and 114 are connected to the two front wheels and assuming that the braking effort on the wheel plate to which cam 114 is connected was 1,000 pounds, and the braking effort on the wheel plate to which cam 112 is connected in 650 pounds, so that the differential between them is greater than 30%, the resulting difference in the distances that the two cams are moved will cause the rocker arm 170 to be tilted roughly as shown in FIG. 9, thereby bringing the operator on switch 194 into engagement with stop 202, and as a consequence, moving that switch to open position. The result, of course, will be that the relay 236 will be open and the red light 242 will be lighted indicating a rejection as desired.

While the invention has been exemplified by a device which indicates rejection if the brakes on any wheel exert less than 250 pounds of effort, or if the differential between the braking efforts of the brakes on either of the pairs of wheels on the same axle is more than 30%, it is to be understood that the invention is not limited to the use of these specific criteria. Thus, the acceptable minimum effort for the brakes on any wheel may be any predetermined number of pounds which when selected, dictates the positions along the paths of movement of the cams at which the switches 138, 140, 142 and 144 are located, and to this end these switches may be adjustably mounted so that their positions can be altered readily.

Similarly, the acceptable maximum differential may have any desired predetermined value which will be used in plotting the cam configuration as illustrated in FIG. 11 and in setting the adjustable stops 202, 204, 206 and 208 as described above. Moreover, the acceptable maximum differential for one pair of wheels need not necessarily be the same as that for the other pair, since the configurations of the cams responding to one pair of wheels may obviously differ from that of the cams responding to the other pair, and since the settings of the stops likewise need not all be the same.

The advantages of this invention will be obvious from the foregoing. Observation of a pair of different colored lights, illustratively red and green, will immediately tell the individual conducting the test whether the brakes of the vehicle tested are or are not acceptable, the decision as to whether the brakes are acceptable being made automatically. It is unnecessary for the operator to weigh the results of the test in any way, and to himself reach a proper conclusion therefrom. If an "Accept" indication is given, there are no other observations to make. On the other hand, the combination of the device herein disclosed with the previously known brake testers permits the individual performing the test to ascertain when a "Reject" indication is given what needs to be done to make the brakes acceptable. This can be accomplished, for example, by reference to the above described tubes 24 or other equivalent means which provide a visual indication of the braking effort exerted on each wheel of the vehicle. Other advantages of the invention will be evident from the foregoing description.

It is apparent that many widely different embodiments of this invention may be made without departing from the spirit and scope thereof, and therefore, it is not intended to be limited except as indicated in the appended claims.

We claim:

1. A brake tester comprising in combination a plurality of members each movable in response to the application of the brakes on a wheel of a vehicle, actuator means, means operatively connecting said first named members to said actuator means, means responsive to said actuator means for detecting each wheel of the vehicle on which the brakes exerted less than a predetermined minimum effort, second means responsive to said actuator means for detecting each pair of wheels on the same axle the brakes of which exerted braking efforts having a differential between them which is more than a predetermined maximum, and means responsive to said detecting means for indicating visually the result of the brake test.

2. A brake tester as described in claim 1 in which the actuator means comprises a cam for each wheel of the vehicle to be tested.

3. A brake tester as described in claim 2 in which the second detecting means comprises a rocking arm assembly for each pair of wheels on the same axle and in which the said rocking arm assembly engages the cams for such pair of wheels.

4. A brake tester as described in claim 3 in which the said cams are slidably supported for movement relative to the rocking arm assembly in engagement therewith and in which the cams are so moved, respectively, by the two of said first named movable members which are movable in response to the application of the brakes on said pair of wheels in the same axle.

5. A brake tester as described in claim 4 in which the rocking arm assembly is slidably supported for sliding movement in a direction transverse to the paths of movement of the said cams engaged thereby and in response to the said sliding movements of the cams.

6. A brake tester as described in claim 5 in which the rocking arm assembly includes a pair of switches one of which is actuated in response to braking efforts exerted on the said two wheels which have a differential between them which is greater than the said predetermined maximum.

7. A brake tester as described in claim 6 in which said first detecting means comprises a switch for each wheel of the vehicle which is engaged and held away from its normal position by the cam for the same wheel prior to movement of said movable members and which is released to move to its normal position by a movement of the said cam in response to a braking effort which is at least equal to the said minimum.

8. A brake tester as described in claim 7 in which all of the said switches are normally closed and are connected in series.

9. A brake tester as described in claim 1 in which there is a movable member for each wheel of the vehicle which is moved in response to the said braking efforts a distance which is proportional to the braking effort on such wheel, in which the actuator means comprises a cam for each wheel of the vehicle, and in which the said cams are operatively connected, respectively, to the corresponding movable member for movement in response to the movement of such movable member.

10. A brake tester as described in claim 9 in which the configuration of the camming surfaces on the cams is determined by the said maximum differential and by the relation of the said movement of the cams to the movement of the said movable members.

11. A brake tester as described in claim 10 in which the second detecting means comprises a rocking arm assembly for each pair of wheels on the same axle and in which the said rocking arm assembly engages the cams for such pair of wheels.

12. A brake tester as described in claim 11 in which the said cams are slidably supported, in which the movements of said cams are relative to the rocking arm assembly in engagement therewith and in which the rocking arm assembly is slidably supported for sliding movement in a direction transverse to the paths of movement of the said cams engaged thereby and in response to the sliding movements of the said cams.

13. A brake tester as described in claim 12 in which the rocking arm assembly includes a pair of switches one of which is actuated in response to braking efforts exerted on the said two wheels which have a differential between them which is greater than the said predetermined maximum.

14. A brake tester as described in claim 1 in which said means for indicating comprises two lights which when lighted indicate, respectively, "Accept" and "Reject."

15. A brake tester as described in claim 14 in which the said means for detecting comprises a plurality of switches and in which the said switches control the circuits to said lights.

16. A brake tester as described in claim 1 which comprises means responsive to said movable members for indicating visually the number of pounds of braking effort exerted by the brakes on each wheel of the vehicle.

17. A brake tester as described in claim 16 in which the actuator means comprises a cam for each wheel of the vehicle.

18. A brake tester as described in claim 17 in which the said means for detecting comprises a pair of switches for each wheel controlling a circuit to said brake test result indicating means.

19. A brake tester as described in claim 17 in which there is a movable member for each wheel of the vehicle which is moved in response to the said braking effort a distance which is proportional to the braking effort on such wheel and in which the said cams are operatively connected, respectively, to the corresponding movable member for movement in response to the movement of such moveable member.

20. A brake tester as described in claim 19 in which the configuration of the camming surfaces of the cams is determined by the said maximum differential and by the relation of the said movement of the cams to the movement of the said movable members.

21. A brake tester as described in claim 9 which comprises releasable means for maintaining the said cams in the positions to which they are moved in response to the said movements of said movable members.

22. A brake tester as described in claim 9 which comprises means responsive to said movable members for indicating visually the number of pounds of braking effort exerted by the brakes on each wheel of the vehicle and releasable means for maintaining the said cams in the positions to which they are moved in response to the said movements of said movable members and for maintaining the said visual indication of the number of pounds of braking effort exerted by the brakes on each wheel of the vehicle.

23. A brake tester as described in claim 22 in which the said means operatively connecting the said movable members to said actuator means has lost motion connections with said movable members which permit the said movable members to return to the position they occupied prior to their movement in response to the said application of the vehicle wheel brakes, in which the said releasable means maintains the cams in the said positions to which they are moved and the indication on the said visual indicating means by maintaining the said connecting means in the positions to which they are moved so moving the cams.

24. A vehicle brake test indicator comprising actuator means responsive to the braking efforts exerted by the brakes on each of the wheels of a vehicle, first means responsive to said actuator means for detecting each wheel of the vehicle on which the brakes exerted less than a predetermined minimum effort, second means responsive to said actuator means for detecting each pair of wheels on the same axle the brakes of which exerted braking efforts having a differential between them which is more than a predetermined maximum, and means responsive to said detecting means for indicating visually the result of the brake test.

25. A vehicle brake test indicator as described in claim 24 in which the actuator means comprises a cam for each wheel of the vehicle to be tested.

26. A vehicle brake test indicator as described in claim 25 in which the second detecting means comprises a rocking arm assembly for each pair of wheels on the same axle, and in which the said rocking arm assembly engages the cams for such pair of wheels.

27. A vehicle brake test indicator as described in claim 26 in which the said cams are slidably supported for movement relative to the rocking arm assembly in engagement therewith and in which the cams are so moved, respectively, by the two of said first named movable members which are movable in response to the application of the brakes on said pair of wheels on the same axle.

28. A vehicle brake test indicator as described in claim 27 in which the rocking arm assembly is slidably supported for sliding movement in a direction transverse to the paths of movement of the said cams engaged thereby and in response to the said sliding movements of the cams.

29. A vehicle brake test indicator as described in claim 28 in which the rocking arm assembly includes a pair of switches, one of which is actuated in response to braking efforts exerted on the said two wheels which have a differential between them which is gerater than the said predetermined maximum.

30. A vehicle brake test indicator as described in claim 29 in which said first detecting means comprises a switch for each wheel of the vehicle which is engaged and held away from its normal position by the cam for the same wheel prior to movement of said movable members, and which is released to move to its normal position by a movement of the said cam in response to a braking effort which is at least equal to the said minimum.

31. A vehicle brake test indicator as described in claim 30 in which all of the said switches are normally closed and are connected in series.

32. A vehicle brake test indicator as described in claim 25 in which the said cams are slidably supported for movement along parallel paths, in which the cams for each pair of wheels on the same axle move along paths which are adjacent to one another, in which the second detecting means comprises a rocking arm assembly for each pair of wheels on the same axle and in which the said rocking arm assembly engages the cams for such pair of wheels.

33. A vehicle brake test indicator as described in claim 32 in which the said movement of the cams is movement relative to the rocking arm assembly and in which the rocking arm assembly is slidably supported for sliding movement in a direction transverse to the said paths of movement of the said cams engaged thereby and in response to the said sliding movements of the cams.

34. A vehicle brake test indicator as described in claim 33 in which the paths of movement of the cams are substantially horizontal and in which the path of movement of the rocking arm assembly is substantially vertical.

35. A vehicle brake test indicator as described in claim 33 in which the rocking arm assembly includes a pair of switches one of which is actuated in response to braking efforts exerted on the said two wheels which have a differential between them which is greater than the said predetermined maximum and in which said first detecting means comprises a switch for each wheel of the vehicle which is engaged and held away from its normal position by the cam for the same wheel prior to the said exertion of braking efforts and which is released to move to its normal position by a movement of the said cam in response to a braking effort which is at least equal to the said minimum.

36. A vehicle brake test indicator as described in claim 35 in which all of the said switches are normally closed and are connected in series.

37. A vehicle brake test indicator as described in claim 36 in which said means for indicating comprises two lights the circuits to which are controlled by said switches and which lights when lighted indicate, respectively, "Accept" and "Reject."

38. A vehicle brake test indicator as described in claim 33 in which the rocking arm assembly comprises a slidable supporting member and a rocker pivotably supported on the said slidable supporting member.

39. A vehicle brake test indicator as described in claim 38 in which the said rocker has three arms extending outwardly from the axis about which said rocker pivots, two of which arms are diametrically opposite one another and carry rollers through which the assembly engages the cams for the said pair of wheels on the same axle and the third of which carries a pair of switches one of which is actuated in response to braking efforts exerted on the said two wheels which have a differential between them which is greater than the said predetermined maximum.

40. A vehicle brake test indicator as described in claim 39 for a vehicle wheel brake tester having movable members for each wheel of the vehicle which are moved, respectively, in response to the said braking efforts a distance which is proportional to the braking effort on such wheel, in which the said cams have operatively connected thereto, respectively, means for transmitting to each cam the said movement of the corresponding movable members and in which the configuration of the camming surfaces on the cams engaged by the said rollers on the rocker is determined by the said maximum differential and by the relation of the said movement of the cams to the movement of the said movable members.

41. A vehicle brake test indicator as described in claim 40 in which the said rocker is pivoted on its axis in response to braking efforts exerted on the said two wheels which are not the same and in which the rocking arm assembly carries thereon stops which are located, respectively, in the paths along which the operating members on the said switches move during the pivoting of said rocker and at positions in which one of them is engaged to actuate switch during pivotal movement of the rocker in response to braking efforts exerted on the said two wheels which have a differential between them which is greater than the said predetermined maximum.

42. An indicator as described in claim 24 for a vehicle wheel brake tested having movable members for each wheel of the vehicle which are moved, respectively, in response to the said braking efforts a distance which is proportional to the braking effort on such wheel, in which the actuator means comprises a cam for each wheel of the vehicle, and in which the said cams have operatively connected thereto, respectively, means for transmitting to each cam the said movement of the corresponding movable member.

43. A vehicle brake test indicator as described in claim 42 in which the configuration of the camming surfaces on the cams is determined by the said maximum differential and by the relation of the said movement of the cams to the movement of the said movable members.

44. A vehicle brake test indicator as described in claim 43 in which the second detecting means comprises a rocking arm assembly for each pair of wheels on the same axle and in which the said rocking arm assembly engages the cams for such pairs of wheels.

45. A vehicle brake test indicator as described in claim 44 in which the said cams are slidably supported, in which the movements of said cams are relative to the rocking arm assembly in engagement therewith and in which the rocking arm assembly is slidably supported for sliding movement in a direction transverse to the paths of the movement of the said cams engaged thereby and in response to the sliding movement of the said cams.

46. A vehicle brake test indicator as described in claim 45 in which the rocking arm assembly includes a pair of switches one of which is actuated in response to a braking effort exerted on the said two wheels which have a differential between them which is greater than the said predetermined maximum.

47. A vehicle brake test indicator as described in claim 46 in which said first detecting means comprises a switch for each wheel of the vehicle which is engaged and held away from its normal position by the cam for the same wheel prior to movement of said movable members, and which is released to move to its normal position by a movement of the said cam in response to a braking effort which is at least equal to the said minimum.

48. A vehicle brake test indicator as described in claim 47 in which all of the said switches are normally closed and are connected in series.

49. A vehicle brake test indicator as described in claim 24 in which said means for indicating comprises two lights which when lighted indicate, respectively, "Accept" and "Reject."

References Cited
UNITED STATES PATENTS

| | | | |
|---|---|---|---|
| 1,887,992 | 11/1932 | Casler | 73—122 |
| 3,365,940 | 1/1968 | MacMillan | 73—126 X |

JERRY W. MYRACLE, Primary Examiner

U.S. Cl. X.R.

116—56

UNITED STATES PATENT OFFICE
CERTIFICATE OF CORRECTION

Patent No. 3,495,450                                February 17, 1970

George E. Swick, Jr., et al.

It is certified that error appears in the above identified patent and that said Letters Patent are hereby corrected as shown below:

Column 2, line 21, "retchets" should read -- ratchets --. Column 8, line 32, cancel "and". Column 11, line 27, "effort" should read -- efforts --; line 62, after "moved" insert -- in --. Column 13, line 49, "tested" should read -- tester --.

Signed and sealed this 24th day of November 1970.

(SEAL)
Attest:

Edward M. Fletcher, Jr.                      WILLIAM E. SCHUYLER, JR.
Attesting Officer                                Commissioner of Patents